April 30, 1968     P. M. STEWART     3,380,350
ROTATING AIR CYLINDER UTILIZING AIR AS AIR SEAL
Filed Oct. 22, 1965     3 Sheets-Sheet 1
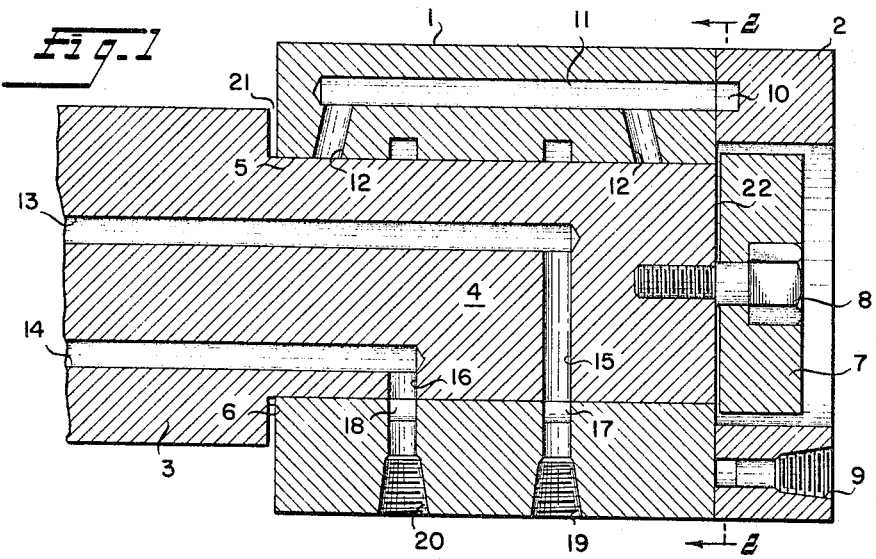
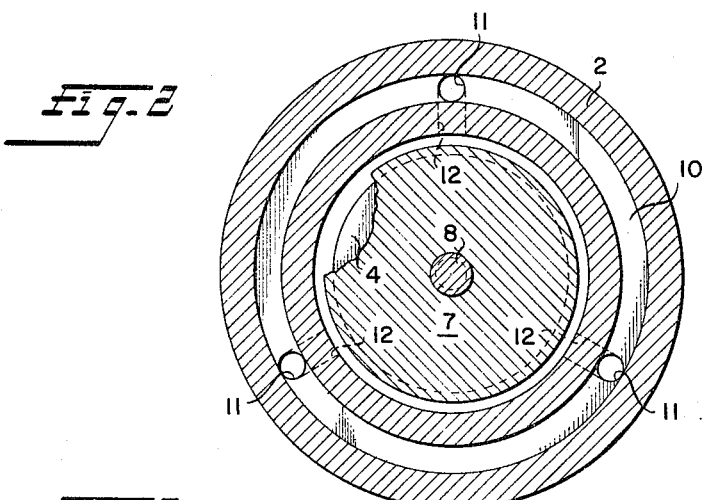
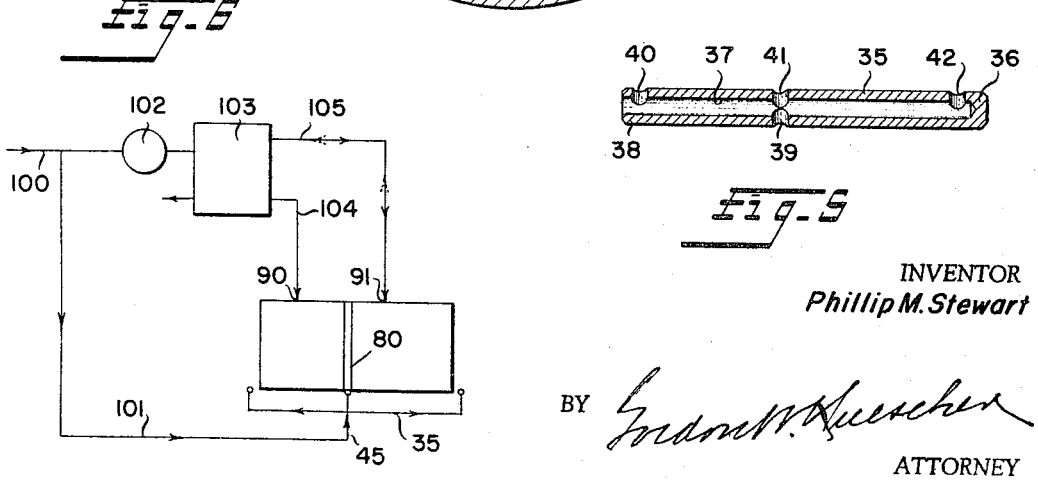
INVENTOR
Phillip M. Stewart
BY *Gordon W. Luescher*
ATTORNEY INVENTOR
Phillip M. Stewart April 30, 1968 P. M. STEWART 3,380,350
ROTATING AIR CYLINDER UTILIZING AIR AS AIR SEAL
Filed Oct. 22, 1965 3 Sheets-Sheet 3

INVENTOR
Phillip M. Stewart

BY *Grant H. Buescher*

ATTORNEY

United States Patent Office 3,380,350
Patented Apr. 30, 1968

3,380,350
ROTATING AIR CYLINDER UTILIZING
AIR AS AIR SEAL
Phillip M. Stewart, Scotts, Mich., assignor to Midwest Gage Co., Inc., Kalamazoo, Mich., a corporation of Michigan
Filed Oct. 22, 1965, Ser. No. 502,027
7 Claims. (Cl. 92—106)

ABSTRACT OF THE DISCLOSURE

An apparatus comprising a housing, a shaft rotatively mounted in the housing, ducts for transferring a fluid from the housing to the rotating shaft to be transferred to a distal portion of the apparatus, and a combination fluid seal and bearing provided on each side of the duct entrance to the shaft in order to serve as both a fluid bearing for the rotating shaft and a seal to prevent fluid applied to the shaft from leaking out and to reduce bearing friction. Another apparatus utilizes a combined fluid bearing and seal for rotating end walls and a rotating and reciprocating piston.

---

The present invention relates to an apparatus, and method for the transfer of fluid from a stationary member to a moving member and providing a seal therebetween, and is especially concerned with a means for providing a seal for a rotating fluid actuated cylinder utilizing fluid bearings.

Devices having surfaces which move with respect to each other and utilizing fluid as a bearing medium are known in the art. Moreover, rotating cylinders having a fluid-actuated piston are also known. However, the prior art devices all utilize sealing means for confining the fluid operating the piston within the cylinder housing which are complicated and which create a high degree of friction when the cylinder is rotating at a high speed, thus limiting the practicable speed at which the cylinder may be rotated.

It is an object of the present invention to provide an apparatus and method for transferring fluid from a stationary member to a moving member and providing a fluid interface therebetween. It is a further object to provide such a method and means involving transfer of fluid from a stationary housing to a rotating cylinder having a fluid-actuated piston. It is a primary object to provide such a method and means providing a fluid seal for the rotating cylinder to prevent leakage of the fluid utilized in actuating the piston. It is an additional object to provide such an apparatus wherein the sealing means is provided without a concomitant increase in friction, thus permitting the cylinder to be rotated at a very high speed. It is still another object to provide such an apparatus which is relatively simple to construct and has few moving parts. The accomplishment of the foregoing and additional objects will become more fully apparent hereinafter.

According to the invention a fixed member, as for example a housing having a cylindrical bore, and a moving member, as for example a rotating cylinder, rotating cylinder walls, and/or a rotating piston are arranged within the housing bore with their surfaces in bearing engagement with the wall of the bore. The rotating cylinder walls and piston are provided with a fluid under superatmospheric pressure for operating the members, as in the case of a piston, or being transferred to channels provided in the rotating member, as for example in the case of a rotating shaft having an apparatus at its distal end to be actuated. Additionally a second fluid is applied at a pressure greater than that of the first fluid at the interfacial space between the moving member and the fixed member, providing a fluid bearing. The presence of the higher pressure fluid at the bearing surfaces at the same time provides a seal preventing the lower pressure fluid from leaking through the interfacial space between the bearing surfaces.

The invention in its preferred embodiment is illustrated by the accompanying drawings in which:

FIG. 1 is a cross-section of one embodiment of the invention.

FIG. 2 is a cross-section taken at the line 2—2 of FIG. 1.

FIG. 5 is an axial cross sectional view of a conduit utilized to distribute the high pressure fluid axially within the housing; and FIG. 6 is a schematic diagram illustrating the fluid valve and feed means for actuating the piston of FIG. 3.

Reference is now made to the accompanying drawings for a better understanding of the invention, wherein all the parts are numbered and wherein the same numbers are used to refer to corresponding parts throughout.

Figure 3:
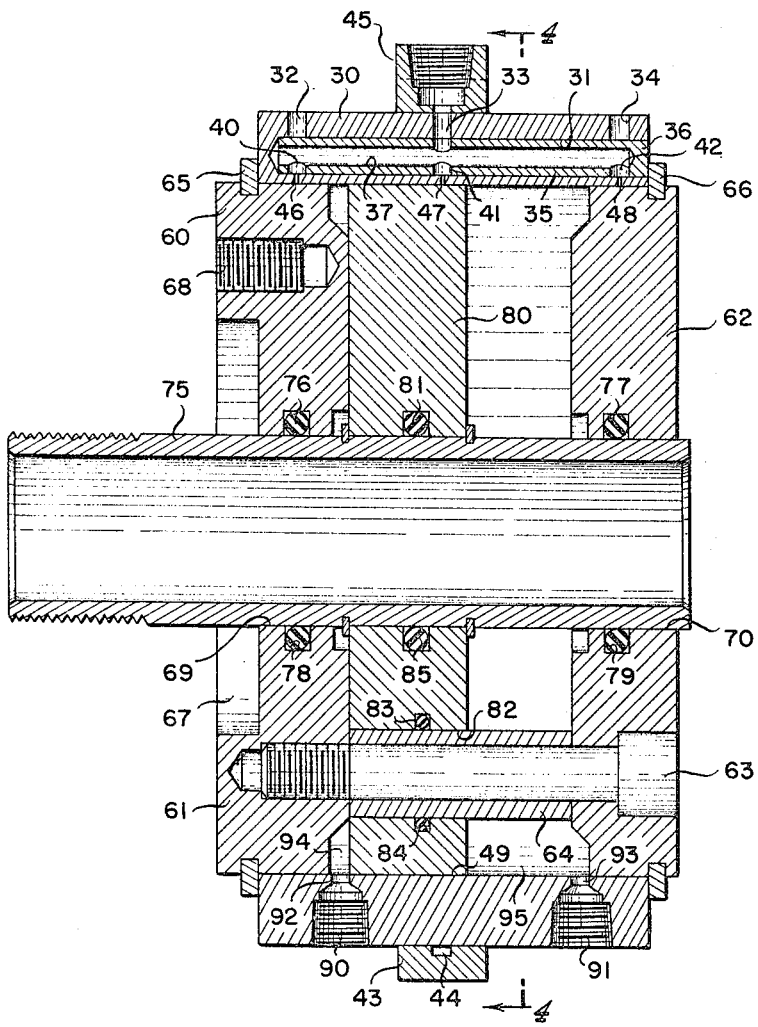
FIG. 3 is an axial cross-section of the invention in a preferred embodiment.

Referring to FIGS. 1 and 2, a portion of an apparatus, as for example a spindle for a lathe designed to have the chuck or collet thereof actuated by fluid pressure externally controlled. The apparatus comprises a stationary cylindrical housing 1 having an annular end plate 2 suitably affixed thereto. A rotating shaft 3 has a reduced bearing end 4 journaled in a cylindrical bore 5 provided in the housing, sufficient clearance being provided between the rotating surface of the bearing and the bearing surface of the housing to provide a space for a fluid such as air to flow therebetween and serve as a bearing medium. The bearing end is restrained axially by means of a shoulder 6 provided on the shaft 3 and a thrust plate 7 affixed to the bearing end 4 by means of a bolt 8.

A high pressure fluid inlet 9 is provided in the end plate 2 communicating with an annular distribution groove 10 also provided in the end plate 2. The groove 10 distributes fluid circumferentially to a plurality of distribution passages 11 positioned parallel to the axis of the cylinder. Each passage 11 is provided with a pair of connecting orifices 12 communicating with the axial cylindrical bore of the housing 1.

The rotating shaft 3 and bearing shaft 4 are provided with axially oriented passages 13 and 14, and radial passages 15 and 16 respectively. Annular grooves 17 and 18 are provided at the inner surface of the housing 1, and communicate with inlets 19 and 20, respectively. Fluid applied to one of the inlets may be used to open an apparatus such as a chuck or collet mounted at the distal end of the draw bar 3, while fluid pressure applied to the other inlet may be utilized to close the structure.

In operation, a fluid, as for example air, is supplied under pressure at the inlet 9. The fluid is distributed to the interfacial space between the bearing surface of the cylindrical bore and the bearing shaft, providing a fluid bearing enabling the shaft to be rotated at a very high speed without developing appreciable friction. The fluid slowly escapes by means of annular escape spaces 21 and 22 provided between the shoulder 6 and the end of the housing 1, and between the thrust plate 7 and the other end of the housing.

Fluid for actuating the apparatus mounted on the draw bar 3 is actuated by applying a fluid under pressure to the inlet 19 and 20, depending upon whether the apparatus is to be opened or closed. Normally the fluid applied to the inlets 19 and 20 would eventually leak between the surfaces of the housing bearing and shaft, and thereby escape to the atmosphere. However, according to the invention, the fluid applied at the inlets 19 and 20 for operating the apparatus such as a chuck or collet, is applied at a pressure lower than that at which the bearing fluid is applied. Consequently, the higher pressure fluid serves as a seal, retaining the lower pressure fluid from escaping into the atmosphere between the bearing surfaces. This arrangement avoids the use of complicated and costly sealing arrangements which impede the freedom of rotation of the shaft.

Figure 4:
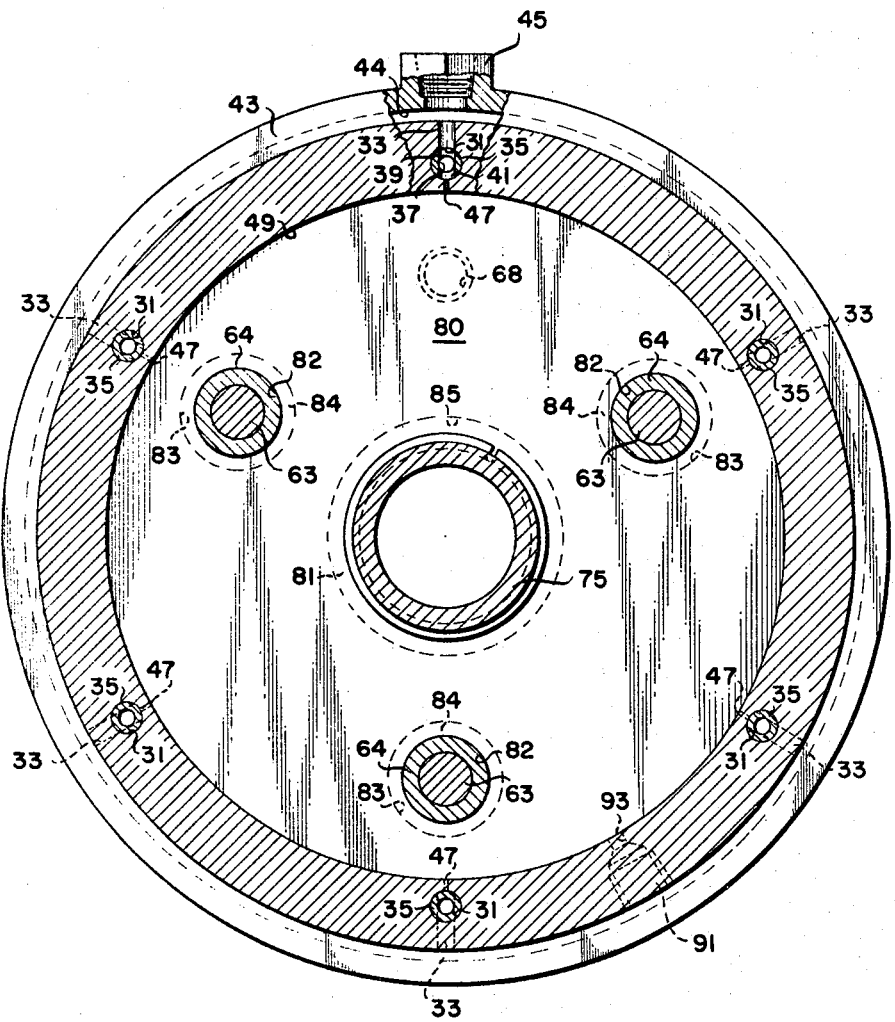
FIG. 4 is a cross-section taken at the line 4—4 of FIG. 3.

Another embodiment of the invention is illustrated in FIGS. 3–5. This embodiment comprises a rotating cylinder bearing having fluid-actuated piston means for operating a chuck or collet. FIGS. 3 and 4 illustrate the structure of the rotating cylinder and piston subassembly. The assembly comprises a stationary outer housing 30 suitably bored to provide a plurality of axial channels 31 circumferentially arranged. Each channel 31 is provided with a plurality of radial channels 32, 33, and 34 connecting the outer surface of the housing 30 with the axial channel 31.

Suitably positioned in each axial channel is a cylindrical transfer pin 35, illustrated in detail in FIG. 5, closed at one end 36, having an axial bore 37 provided therein, and having an open end 38. The transfer pin 35 is provided with an inlet port 39 and outlet ports 40, 41, and 42, all communicating with the axial bore 37. An annular distribution collar 43 fixedly mounted about the central circumference of the outer housing 30 is provided at its inner surface with an annular distribution groove 44 communicating with each centrally located radial channel 33. The distribution groove 44 is supplied with fluid by means of an inlet 45. Distribution of the bearing fluid to the bearing surfaces is provided by means of orifices 46, 47, and 48 communicating with the outlet ports 40, 41, and 42 respectively, and opening to the bearing surface 49 of the housing 30.

Rotatively mounted within the housing 30 is a cylinder 60 comprising a pair of spaced-apart disc-formed end walls comprising a front wall 61 and a rear wall 62. The front wall 61 and rear wall 62 are affixed together by means of bolts 63 and tubular spacer 64. The cylinder is restrained in position axially with respect to the housing 30 by means of thrust rings 65 and 66. The front wall 61 is provided with a suitable recess 67 and a threaded hole 68 for fixedly engaging a suitable spindle or other device to be supported and operated upon. Slideably mounted within axially positioned apertures 69 and 70 is a tubular shaft 75. Fluid seals between the shaft 75 and the front wall and rear wall are provided by means of O-rings 76 and 77 retained in annular grooves 78 and 79 provided in the walls 61 and 62, respectively.

A piston 80 is coaxially mounted on the shaft 75 and suitably affixed thereto. A seal between the inner axial surface of the pistons and the outer surface of the shaft is provided by means of an O-ring 81 retained in an annular groove 85 provided in the piston. The piston is provided with a plurality of cylindrical apertures 82 slideably engaging the tubular spacers 64, a fluid seal being provided therebetween by means of an O-ring 83 retained in an annular groove 84. Fluid for actuating the piston is provided through threaded ports 90 and 91 communicating with the chamber between the cylinder walls 61 and 62 through orifices 92 and 93. The walls 61 and 62 are contoured to provide annular intake chambers 94 and 95 permitting fluid to be introduced into the chamber of the cylinder when the piston engages the wall at its terminal point of travel.

The operation of the apparatus shown in FIGS. 3–5 is diagrammatically shown in FIG. 6. Air from a high pressure supply, as for example 100 p.s.i. is introduced by means of a duct 100. The air having unmodified pressure is directly supplied by means of a duct 101 to the transfer pins 35, where the air is distributed axially to provide a bearing medium between the bearing surface of the housing 30 and the bearing surfaces of the front wall 61 and the rear wall 62, and the bearing surface of the piston 80. A second branch of the air supply duct 100 is applied to a pressure regulator 102 which reduces the air pressure to a suitable value lower than the pressure of the unregulated air, as for example 80 p.s.i. The air under reduced pressure is then ducted to a four-way valve 103 which alternatively introduces air into the ducts 103 and 105 which are connected to the ducts 90 and 91. When air pressure is applied to the duct 104, moving the piston to the right, the duct 105 serves as an air exhaust duct. Conversely, when the duct 105 supplies air to the cylinder, moving the piston to the left, the duct 104 serves as an exhaust duct.

The apparatus is placed in operation by applying the air supply to the apparatus. The high pressure supply introduces air at the duct 45, the air being circumferentially distributed in the duct defined by the annular distribution groove 44 of the collar 43 and the outer surface of the housing 30. Air from this duct is introduced into all of the central radial channels 33 from which air is further distributed within the transfer pins to the outlet ports 40, 41, and 42, and subsequently through the orifices 46, 47, and 48, whereby the air is forced between the bearing surfaces. The presence of the air provides an extremely low friction bearing between the inner bearing surface of the housing 30 and the outer bearing surface of the front wall 61, rear wall 62, and piston 80. Because of the air bearing provided, the rotating portion of the assembly may be rotated at an extremely high velocity and with very little friction.

In order to move the piston and shaft portion of the assembly for opening or closing a chuck or collet (not shown), the four-way valve is placed in position to apply air alternatively at the ports 90 or 91. This results in the introduction of air into the cylinder chamber, moving the piston to one side or the other. The intake chambers 94 and 95 are provided permitting the introduction of air into the cylinder even when the piston is in contact engagement with the inner surface of the cylinder walls. Once the piston is moved away from the wall surface by the pressure applied to the annular surface of the chambers, the air may then act upon the entire surface of the system to provide full operating force.

The air applied under pressure into the cylinder chamber at either side of the piston normally would escape through the space between the bearing surface of the piston 80 and the bearing surface of the housing 30, and through the space between the bearing surface of the rotating walls 61 and 62 and the bearing surface of the housing 30, resulting in the loss of sufficient operating pressure. In prior art apparatus utilizing a rotating piston, mechanical seals have been provided at the bearing surfaces to prevent such loss of air actuating the piston. However, the use of such mechanical seals greatly increases frictional resistance and results in an apparatus which can be operated only at drastically reduced rotational speeds. According to the present invention, the high pressure air applied at each end of the cylinder and at the bearing surface of the piston act as an air seal confining the lower pressure air actuating the piston within the cylinder chambers and to one side or the other of the piston. This additional function is accomplished without any substantial increase in frictional resistance, and without reduction in the maximum rotational velocity of the rotating system.

If a liquid such as oil is employed as the fluid maintained under higher pressure, it may be unnecessary to provide means for collecting any portion of such liquid which escapes from the interfacial spaces between the rotating surfaces.

Although the present invention has been shown in only relatively few embodiments, it may be applied to many other embodiments. The principal requirement is the use of a dual fluid supply, one supply being maintained at a pressure lower than that of the other supply, the fluid under lower pressure being utilized to perform the work function.

The present invention permits seals to be provided between rotating surfaces and fixed surfaces defining a working chamber which is extremely simple, compact in construction, and economical to manufacture. The invention permits high-speed operation with elimination of friction and wear, thereby reducing repair service of seals. The invention further permits the sealing fluid component to be utilized for a second important function, for example, that of providing a fluid bearing medium between the rotating and fixed surfaces, although other secondary functions could also be performed.

As a practical example of the improvement resulting from the invention a comparison may be made with prior art equipment. The best old rotating air cylinder known to the inventors costs $3500, is 16¼ inches long, can only stand up to 1000 revolutions per minute, and will only take up to a one inch bar within its central cavity for feeding through the spindle to the chuck. The rotating air cylinder of the invention as illustrated in FIGS. 3–6, is only about 6 inches long, is operative with much greater diameter bars, is much less expensive, is extremely simple, and is operative at rotational speeds of up to perhaps 10,000 revolutions per minute.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

I claim:

1. An apparatus comprising a stationary housing member having an axially positioned bore, a rotatable assembly comprising a shaft axially positioned in said bore having a pair of end walls mounted thereon through axial openings provided in said end walls and means affixing said end walls to each other in parallel axially spaced-apart relationship, and a piston positioned intermediate said end walls and affixed to said shaft, the peripheries of each of said end walls and said piston having an axially oriented surface in closely spaced-apart bearing engagement with the surface of said bore, and means restraining said end walls axially with respect to said housing, said end walls and said housing cooperating to define a chamber and said piston being arranged to move axially within said chamber causing axial movement of said shaft, means adapted for providing a fluid under superatmospheric pressure to said chamber alternatively on one side or the other of said piston for moving said piston axially in either direction within said chamber, and means for applying a fluid under a pressure greater than that of said first fluid at the interfacial spaces between the peripheries of said end walls and said piston and the bearing surface of said bore, whereby a fluid bearing is provided at said bearing interfaces supporting said end walls and said piston for rotation and whereby a seal is provided at each of said interfacial spaces preventing leakage therethrough of said first fluid.

2. An apparatus according to claim 1 wherein said means for providing said fluid to said piston and said fluid to the interfacial spaces between the peripheries of said end walls and said piston and the bearing surface of said bore comprises duct means having two branches, one branch adapted to supply fluid directly to the interfacial space between said bore and said end walls and piston and the other branch having pressure reducing means connected therein and being adapted to provide fluid to said chamber at reduced pressure.

3. An apparatus according to claim 1 wherein both fluids are air.

4. An apparatus comprising a stationary housing member having an axially positioned bore of circular cross-section, a rotatable assembly comprising a tubular shaft axially positioned in said bore having a pair of disc-form end walls mounted thereon through axial openings provided in said end walls, means providing a fluid seal between said axial openings and said shaft and means affixing said end walls to each other in parallel axially spaced-apart relationship, and a piston positioned intermediate said end walls and affixed to said shaft, the peripheries of each of said end walls and said piston having an axially oriented surface in closely spaced-apart bearing engagement with the surface of said bore, and means restraining said end walls axially with respect to said housing, said end walls and said housing cooperating to define a cylindrical chamber and said piston being arranged to move axially within said chamber causing axial movement of said shaft, means adapted for providing a fluid under superatmospheric pressure to said chamber alternatively on one side or the other of said piston for moving said piston axially in either direction within said chamber, and means for applying a fluid under a pressure greater than that of said first fluid at the interfacial spaces between the peripheries of said end walls and said piston and the bearing surface of said bore, whereby when said piston and end walls are rotated a fluid bearing is provided at said bearing interfaces supporting said end walls and said piston and whereby a seal is provided at each of said interfacial spaces preventing leakage therethrough of said first fluid.

5. An apparatus according to claim 4 wherein said housing member is provided with both axial and peripheral channels adapted to distribute said second named fluid uniformly to said interfacial spaces.

6. An apparatus according to claim 4 wherein said means for providing said fluid to said piston and said fluid to the interfacial spaces between the peripheries of said end walls and said piston and the bearing surface of said bore comprises duct means having two branches, one branch adapted to supply fluid directly to the interfacial space between said bore and said end walls and piston and the other branch having pressure reducing means connected therein and being adapted to provide fluid to said chamber at reduced pressure.

7. An apparatus according to claim 4 wherein both fluids are air.

References Cited

UNITED STATES PATENTS

| | | | |
|---|---|---|---|
| 2,153,774 | 4/1939 | Poitras et al. | 277—70 X |
| 2,442,202 | 5/1948 | Hughes-Caley. | |
| 2,536,565 | 1/1951 | Ostergren | 92—106 |
| 2,621,087 | 12/1952 | Kluge | 308—36.3 |
| 2,772,103 | 11/1956 | Strub | 308—36.3 |
| 2,835,227 | 5/1958 | Gamet | 92—106 |
| 2,907,304 | 10/1959 | Macks | 308—5 X |
| 3,015,315 | 1/1962 | Strimel | 277—71 X |
| 3,082,009 | 3/1963 | Whitley et al. | |

FOREIGN PATENTS

| | | |
|---|---|---|
| 875,980 | 7/1942 | France. |
| 513,390 | 10/1939 | Great Britain. |
| 980,048 | 1/1965 | Great Britain. |

MARTIN P. SCHWADRON, *Primary Examiner.*

I. C. COHEN, *Assistant Examiner.*